(12) United States Patent
Hegdal et al.

(10) Patent No.: US 10,339,012 B2
(45) Date of Patent: *Jul. 2, 2019

(54) FAULT TOLERANT APPLICATION STORAGE VOLUMES FOR ENSURING APPLICATION AVAILABILITY AND PREVENTING DATA LOSS USING SUSPEND-RESUME TECHNIQUES

(71) Applicant: VMWARE, INC., Palo Alto, CA (US)

(72) Inventors: Gururaja Hegdal, Bengaluru (IN); Prasanna Sankar, Bengaluru (IN); Marichetty M.S., Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/462,917

(22) Filed: Mar. 20, 2017

(65) Prior Publication Data

US 2018/0165163 A1 Jun. 14, 2018

(30) Foreign Application Priority Data

Dec. 14, 2016 (IN) .............................. 201641042641

(51) Int. Cl.
*G06F 11/00* (2006.01)
*G06F 11/14* (2006.01)
*G06F 11/16* (2006.01)
*G06F 8/60* (2018.01)

(52) U.S. Cl.
CPC ............ *G06F 11/1469* (2013.01); *G06F 8/60* (2013.01); *G06F 11/1612* (2013.01); *G06F 2201/84* (2013.01)

(58) Field of Classification Search
CPC . G06F 9/45545; G06F 9/4843; G06F 11/2069
See application file for complete search history.

(56) References Cited

U.S. PATENT DOCUMENTS

| 9,836,357 | B1* | 12/2017 | Wilk ................... G06F 11/1464 |
| 2005/0038968 | A1* | 2/2005 | Iwamura ............. G06F 11/2058 |
| | | | 711/162 |
| 2008/0104346 | A1* | 5/2008 | Watanabe ........... G06F 11/2069 |
| | | | 711/162 |
| 2009/0119665 | A1* | 5/2009 | Venkitachalam ....... G06F 11/14 |
| | | | 718/1 |

(Continued)

*Primary Examiner* — Joshua P Lottich

(57) ABSTRACT

A fault tolerant system is described for deploying an application contained in an application storage volume, which may be a virtual disk, on a virtual machine (VM) in a remote desktop environment. The application can be executed on the VM after mounting the virtual disk. A backup of the virtual disk is produced by cloning the virtual disk to a different storage device than the location of the primary virtual disk. In some embodiments, if the primary virtual disk fails during execution of the application, the application is suspended, redirected to the backup virtual disk, and resumed from the backup virtual disk. In other embodiments, if the primary virtual disk fails during execution of the application, a child process is spun off from the parent process using forking techniques, the child process is directed to the backup virtual disk, and the application is resumed from the backup virtual disk.

20 Claims, 7 Drawing Sheets

(56) References Cited

U.S. PATENT DOCUMENTS

| | | | |
|---|---|---|---|
| 2013/0047160 A1* | 2/2013 | Conover | G06F 8/65 |
| | | | 718/1 |
| 2016/0004611 A1* | 1/2016 | Lakshman | G06F 11/2058 |
| | | | 714/6.23 |
| 2016/0359981 A1* | 12/2016 | Ulatoski | H04L 63/08 |
| 2018/0097869 A1* | 4/2018 | Chen | H04L 67/34 |

* cited by examiner

FAULT TOLERANT APPLICATION STORAGE VOLUMES FOR ENSURING APPLICATION AVAILABILITY AND PREVENTING DATA LOSS USING SUSPEND-RESUME TECHNIQUES

RELATED APPLICATIONS

Benefit is claimed under 35 U.S.C. 119(a)-(d) to Foreign Application Serial No. 201641042641 filed in India entitled "FAULT TOLERANT APPLICATION STORAGE VOLUMES FOR ENSURING APPLICATION AVAILABILITY AND PREVENTING DATA LOSS USING SUSPEND-RESUME TECHNIQUES", on Dec. 14, 2016, by VMware, Inc., which is herein incorporated in its entirety by reference for all purposes.

The present application Ser. No. 15/462,917 is related in subject matter to U.S. patent application Ser. No. 15/462,932, which is incorporated herein by reference.

TECHNICAL FIELD

The present disclosure generally relates to managing applications on endpoint devices in enterprise environments, and more specifically to improving the reliability of applications that are deployed on endpoint devices using application storage volumes.

BACKGROUND

The management of applications on endpoint devices is a considerable challenge for Information Technology (IT) departments of large organizations today. In a typical enterprise, the IT department needs to perform management functions, such as installing, updating, and deleting applications on hundreds or thousands of endpoints efficiently and reliably. Various products have been developed to address the needs of IT departments in performing these functions. The focus of much of this technology has been to provide ways to perform application management operations that are efficient, reliable, and don't rely on use of traditional installers, which can require extensive administrator involvement and are prone to various other issues.

The increased presence of remote desktop technologies in the enterprise, such as those based on Virtual Desktop Infrastructure (VDI) and Desktop-as-a-Service (DAAS), has introduced additional complexities, while at the same time offering new possibilities and approaches for addressing the application management challenges of IT departments.

In a conventional VDI or DAAS environment, a user is provisioned a virtual desktop and is allowed to access his or her virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktops and all of the application execution takes place on the remote host server, which is linked to the local client device over the network, using a remote display protocol such as remote desktop protocol (RDP), PC-over-IP (PCoIP) protocol, virtual network computing (VNC) protocol, or the like. Using such a remote desktop protocol, the user can interact with applications of the virtual desktop, which are running on the remote host server, such that the display (i.e., image data), sound, keyboard, mouse, and other input/output information is communicated between the local client device and the server. A common implementation of this approach is to host multiple desktop operating system instances on a server hardware platform running a hypervisor.

One approach for addressing the application management problem, suited particularly to the remote desktop space, utilizes application storage volumes, which are centrally stored and managed containers, such as virtual disks, containing one or more applications. With this technology, the application storage volumes are maintained in a central storage location that is accessible by virtual machines (VMs). For example, the application storage volumes might be located on the server where the VMs execute or on a separate storage array device.

Applications delivered using application storage volumes can become available on or be removed from the VM in a near-instant manner and can look and feel (to a user accessing the application on the VM via a client device) natively installed, while requiring minimal administrator involvement. Administrators can update or replace applications in real time and remove any assigned application, either immediately, while the user is still logged in, or at a next login or reboot. Furthermore, the administrator can perform these operations on any number of VMs simultaneously by simply indicating, via a management interface, which VMs or groups of VMs the operations should be performed on.

However, numerous difficulties still exist. For example, a failure that makes the application storage volume unavailable while an application is running can result in the application becoming unavailable and, perhaps more importantly, lead to data loss, such as loss of the application cache. Such failures can, for example, result from failure of a storage array or device where the application storage volume is hosted, inaccessibility of the storage array or device, corruption of the application storage volume, or an other failure making the application storage volume unavailable.

Particularly in industries where applications are expected to be up and running non-stop, such as the healthcare industry, the consequences of such a failure can be disastrous. To illustrate the impact, consider a situation where an application storage volume contains a clinical application that is being used to retrieve a large amount of data related to a group of patients, which is needed urgently. Further, assume that such a query takes about one hour to complete. In the middle of the operation, if the application storage volume becomes unavailable, all information that has been retrieved up until that point in time (which is cached in memory) would be lost. If the activity is resumed, the entire process would have to start from the beginning.

Similar disastrous situations may arise in other industries and other contexts where retrieval of big data is involved, or where data loss and application unavailability otherwise entails significant consequences. To compound these difficulties, because a single application storage volume may be attached to a group of VMs, the failure of the application storage volume may impact not just one desktop but all desktops in the group.

DETAILED DESCRIPTION

Figure 1:
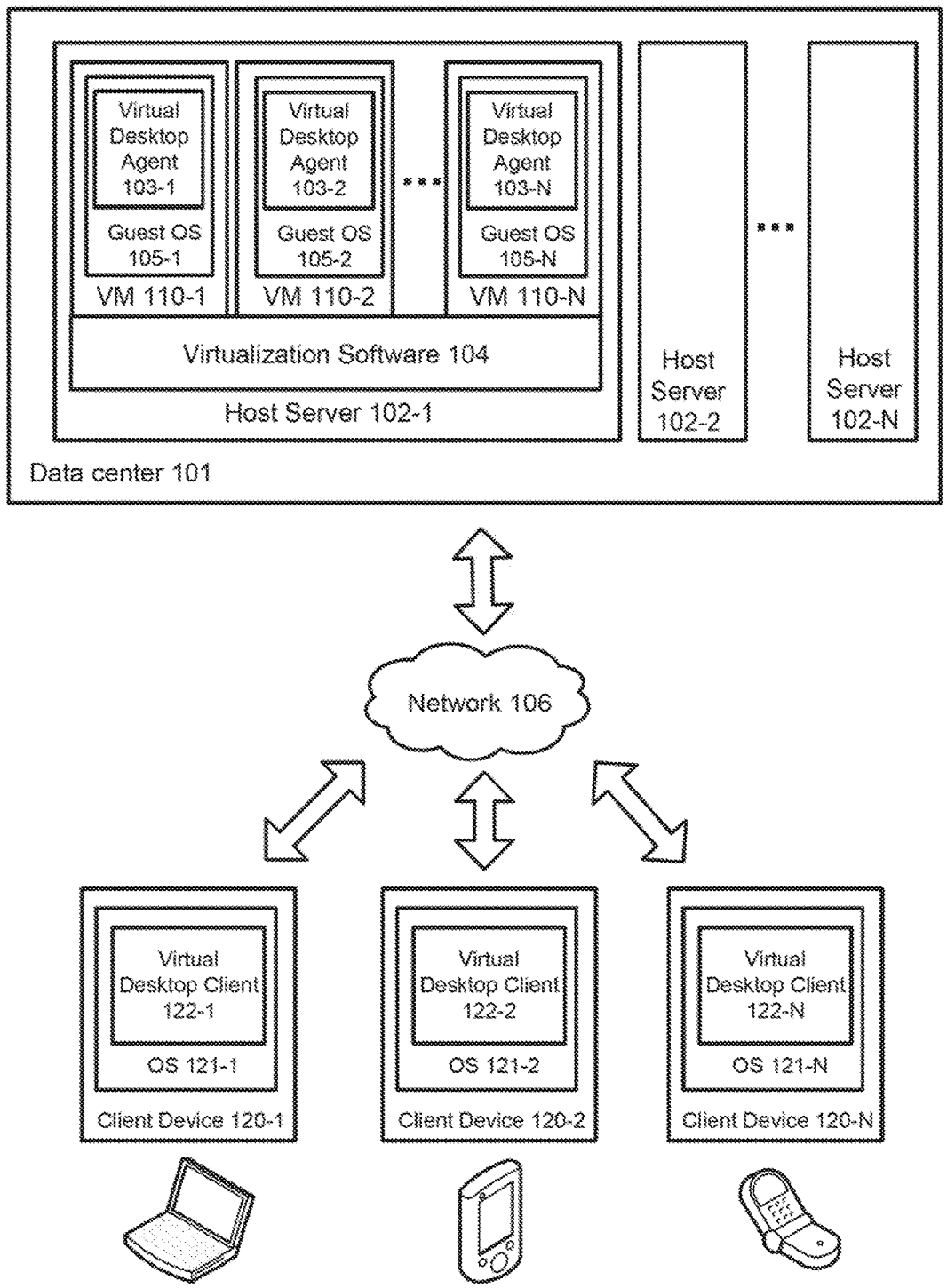
FIG. 1 illustrates an example of a virtual desktop environment, in accordance with various embodiments.

Systems and methods in accordance with various embodiments of the present disclosure overcome at least some of the above-mentioned shortcomings and deficiencies by providing more reliable ways to deliver applications using application storage volumes. In particular, embodiments described herein leverage an agent that detects failure of an application storage volume before the failure is detected by applications running from the application storage volume and applies various techniques to prevent application crashes and data loss.

In one embodiment, the described invention is implemented in a remote desktop environment, such as a VDI or DAAS environment. However, it will be apparent to one skilled in the art that the techniques and methods described herein are applicable in other environments, including locally executing desktop environments.

In various embodiments, an application can be delivered to a remote desktop that is presented by a virtual machine (VM) executing on a server by assigning an application storage volume ("ASV"), which may be a read-only container such as a virtual disk containing one or more applications, to the desktop. When the ASV is assigned to the desktop, an agent operating on the VM attaches or mounts the virtual disk of the ASV to the desktop. When the agent mounts the virtual disk, it also configures the remote desktop so that the application(s) contained in the ASV become available in the desktop and appear and perform (to a user accessing the application on the VM via a client device) natively installed. For example, the agent may modify the registry entries on the operating system of the VM to make the application executable directly from the virtual disk.

The virtual disk may physically reside on a storage device (e.g., a disk array, Solid State Drive (SSD), etc.) that is part of or connected to the server. The assignment of the disk may be performed by merely pointing or directing the VM to the location of the virtual disk, without necessarily moving the virtual disk to a different physical location or making copies of the virtual disk. In this way, a single virtual disk or ASV may be assigned to any number of VMs quickly and efficiently.

The above-described framework of attachable virtual disks containing applications can be used to manage applications on endpoints, including in remote desktop environments. However, as discussed previously, systems that are dependent on virtual disks may be vulnerable to certain failure modes. For example, if there is a failure accessing the ASV, applications running from the ASV may crash, become unavailable until the ASV is recovered, and loss of application data may result. This may occur in cases of failure of the storage array or storage device where the ASV is hosted, inaccessibility of the storage array or storage device, corruption of the ASV, or any other failure making the ASV unavailable.

To address these problems, embodiments described herein leverage an agent that detects failure of the ASV before the failure is identified by applications running from the ASV, and applies various techniques to prevent the application from terminating. Two approaches for preventing application failure in the event of ASV failure are discussed herein. One approach involves suspending and resuming the application, and the other approach involves forking the application into a parent and a child process.

In both approaches, the process can begin by obtaining an instruction from a user or an administrator to enable the fault tolerance system for the particular application storage volume. Namely, because the fault tolerance feature may consume various system resources, it may be desirable to turn it on only for some application storage volumes and not for others. For example, the feature may be turned on for application storage volumes that contain critical applications (e.g., where unexpected termination and/or data loss of the application could be disastrous) and not other, less critical application storage volumes. Hence, in various embodiments, the user or administrator may be given an option to select (e.g., through settings or in response to a prompt that is presented during some point in the application storage volume deployment process to turn the feature on or off.

In both the suspend-resume and forking approaches, once the fault tolerance feature is turned on for a particular application storage volume, the system creates a backup, or clone, of the application storage volume, also referred to herein as a "secondary" application storage volume or "secondary" virtual disk. The backup can be stored in a different storage device t e.g., different disk array or different SSD), so that failure of one storage device does not result in the failure of both the primary and the secondary application storage volume.

During execution of the application, the agent on the VM monitors the processes to detect any failure of the application storage volume. As will be discussed in more detail below, the agent is able to detect a failure before the application is affected, such that measures can be taken prior to the application unexpectedly terminating.

If the agent detects a failure of the application storage volume, it initiates a failover process to the secondary application storage volume in order to prevent termination of the application. In some embodiments, the process involves a suspend and resume operation. In other embodiments, the process involves a forking operation.

In suspend and resume embodiments, when the agent detects a failure of the application storage volume, the agent suspends the application running from the primary application storage volume, mounts the secondary application storage volume, and re-directs any operating system calls accessing the application to the secondary application storage volume. Once the redirection is performed, the application is resumed, which returns it to its previous running state with previous data preserved. The user may experience a slight delay in accessing the application during the process due to the suspend and resume operation but she may otherwise be unaware of the processes taking place. Consequently, in order to ensure that another backup of the application storage volume is available in case of another failure, the agent can start creating a subsequent backup of the current (i.e., secondary) application storage volume. If failure of the secondary application storage volume is detected, the subsequent backup can be used in a similar manner to failover the application.

In forking operation embodiments, when the agent detects a failure of the application storage volume, the agent spins off a child process, which is duplicated from the running application process (i.e., the "parent"), while suspending the parent application process. Before the child application process starts running, the agent attaches the secondary application storage volume and the child process is directed to the secondary application storage volume once it is forked. This operation may happen so quickly that end users who are accessing the application might not notice any behavioral change or otherwise be aware that there was a failure of the application storage volume. Hence, this approach may be more suitable for critical applications where no delay whatsoever is tolerable, such as certain healthcare applications. Consequently, in order to ensure that another backup of the application storage volume is available in case of another failure, the agent can start creating a subsequent backup of the current (i.e., secondary) application storage volume. If failure of the secondary application storage volume is detected, the subsequent backup can be used in a similar manner to preserve the application.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running, on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link, between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third party service provider (e.g., in case of DAAS).

By way of illustration, host server 102-1 can intemperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g. 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input even (e.g., keyboard, mouse events) to the remote desktop agent.

It should be noted that the particular virtual desktop environment illustrated FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
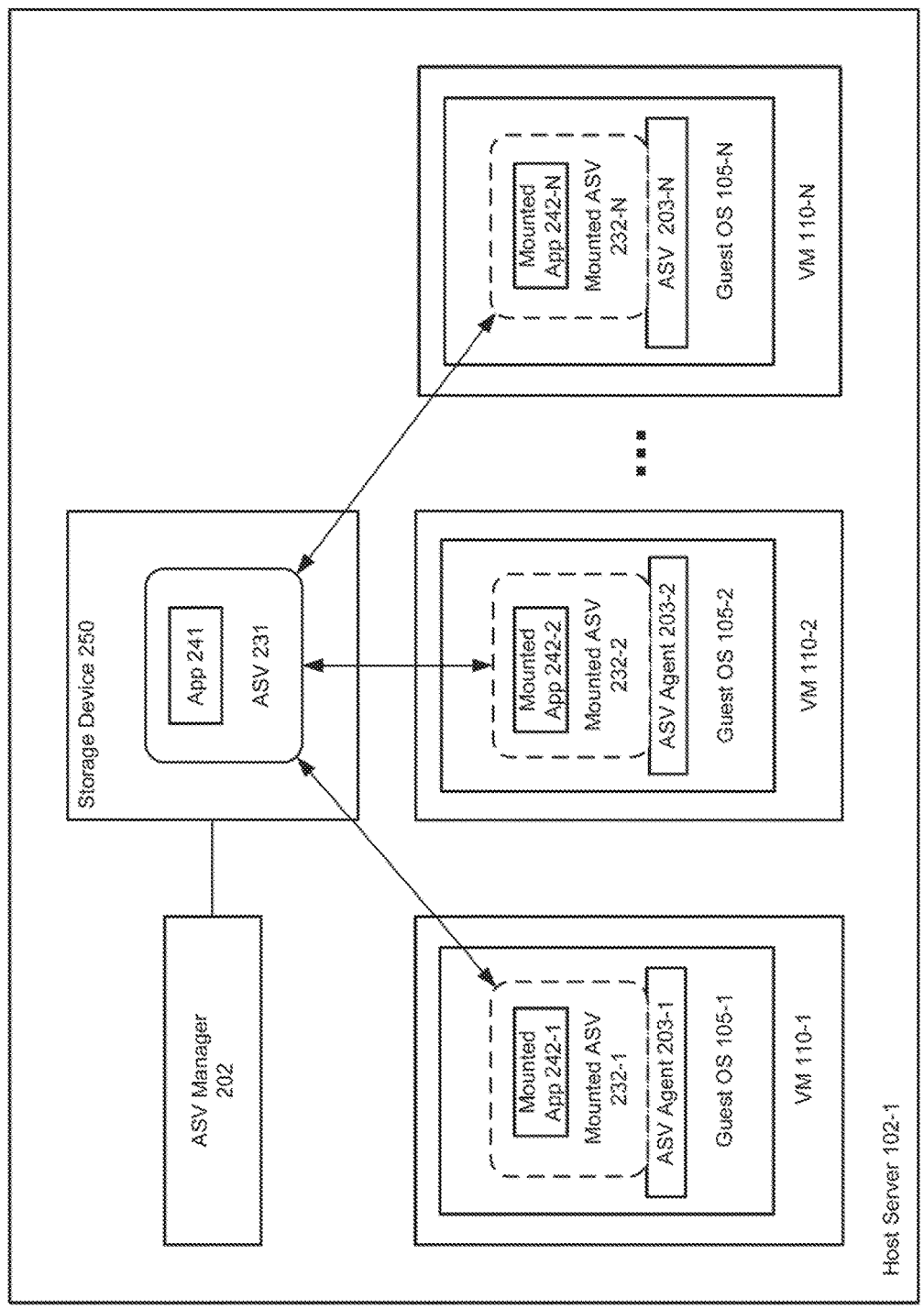
FIG. 2 illustrates an example architecture of a system for application delivery using application storage volumes in a remote desktop environment, in accordance with various embodiments.

FIG. 2 illustrates an example architecture of a system for application delivery using application storage volumes in a remote desktop environment, in accordance with various embodiments. The example of FIG. 2 illustrates a deployment of art application 241 contained in an ASV 231 to the virtual machines 110-1, 110-2, 110-N and the host server 102-1 illustrated in FIG. 1. As illustrated in the example of FIG. 2, the host server 102-1 contains a storage device 250, which may for example be a storage array or an SSD, which stores the ASV 231. An application 241 is contained in the ASV 231.

For the sake of simplicity, a single application 241 is contained in the ASV 231 in the example of FIG. 2. However, in various embodiments, the ASV 231 may contain numerous applications, which may be more convenient for administrators managing the system.

Application storage volume agents 203-1, 203-2, 203-N can execute in the corresponding guest OS 105-1, 105-2, 105-N of each VM 110-1, 110-2, 110-N. The agents 203-1, 203-2, 203-N can perform various functions on the VMs 110-1, 110-2, 110-N for enabling application delivery on the VMs 110-1, 110-2, 110-N from the ASV 231.

In various embodiments, an administrator can manage application storage volumes (e.g., 231) via an application storage volume manager 202 executing in the host server 102-1 203. For example, the administrator ma be able to access the ASV manager 202 via an interface and perform operations on VMs (e.g., 110-1, 110-2, 110-N) such as assigning or removing assigned ASVs (e.g., 231). In various embodiments, the ASV manager 202 can also perform various automated functions in the ASV (e.g., 231) deployment and operation processes.

For example, to deploy an application (e.g., 241) to one or more VMs (e.g., 110-1, 110-2, 110-N), an administrator can access the system (e.g., via an interface to the ASV manager 202) and view a library of available ASVs (e.g., 231) containing various applications (e.g., 241). The administrator can then assign an ASV (e.g., 231) to one or more selected VMs (e.g., 110-1, 110-2, 110-N) in order to deploy the applications (e.g., 241) in the ASV (e.g., 231) to the selected VMs (e.g., 110-1, 110-2, 110-N).

In various embodiments, the ASV 231 may be a read-only virtual disk, such as VHD or VMDK. The ASV 231 may contain all application 241 components necessary for the application 241 to be executed from the ASV 231. For example, the ASV 231 may be created by an administrator through the ASV manager 202 by setting up a designated "capture" machine, such as a clean VM, installing the application 241 on the capture machine, and capturing the application 241 components into the ASV 231 from the changes caused by the installation. For example, the ASV 231 may be created by capturing a snapshot of the clean VM before installing the application and then capturing a delta snapshot of the VM after the application has been installed, where the delta snapshot contains the application components.

In various embodiments, once the ASV 231 is assigned to the VM 110-1, 110-2, 110-N, the agent 203-1, 203-2, 203-N operating on the VM 110-1, 110-2, 110-N attaches or mounts the virtual disk of the ASV 231 to the VM. Accordingly, the ASV 231 may appear in each corresponding VM 110-1, 110-2, 110-N as a mounted drive 232-1, 232-2, 232-N. Alternatively, the ASV 231 may not appear as a separate mounted drive by hiding any assigned drive letter (or not mapping a separate drive letter at all) to the ASV 231. The mounted ASVs 232-1, 232-2, 232-N are illustrated with dashes to indicate that the ASV 231 merely appears inside the corresponding VMs 110-1, 110-2, 110-N while its physical location remains in the storage device 250. Similarly, the application 241 in the ASV 231 becomes available in each VM 110-1, 110-2, 110-N as a mounted application 242-1, 242-2, 242-N although it may function and appears to a user identical to how it would be if it was installed directly in the VM 110-1, 110-2, 110-N.

The agent is software applied to a virtual machine to virtualize any attached application storage volume into the operating system to make the application on that volume appear as though the application was natively installed on the VM. Hence, in various embodiments, when a mounted application 242-1, 242-2, 242-N is executed on a VM 110-1, 110-2, 110-N, the execution takes place from the application 241 on the ASV 231 in the storage device 250. The agent 232-1, 232-2, 232-N can operate as a filter driver and intercept calls to the mounted application 242-1, 242-2, 242-N from the OS 105-1, 105-2, 105-N and directs them to the virtual disk 231. Returns from the application 241 on the virtual disk 231 are likewise routed back to the OS 105-1, 105-2, 105-N by the agent 203-1, 203-2, 203-N. The two-way arrows leading between the ASV 231 on the storage device 250 and the ASVs in the VMs 110-1, 110-2, 110-N in the example of FIG. 2 are intended to illustrate this two-way flow of data between the VMs 110-1, 110-2, 110-N and the storage device 250 that occurs when the mounted applications 242-1, 242-2, 242-N are executing from the ASV 231 on the storage device 250.

In various embodiments, when the agent 203-1, 203-2, 203-N mounts the virtual disk, it can also configure the remote desktop so that the application 241 contained in the ASV 231 become available in the desktop and appears and performs (to a user accessing the application on the VM 110-1, 110-2, 110-N via a remote client device) natively installed. For example, the agent 203-1, 203-2, 203-N may modify the registry entries on the operating system 105-1, 105-2, 105-N of the VM 110-1, 110-2, 110-N to make the application executable directly from the virtual disk 231.

As illustrated in the example of FIG. 2, in this case the ASV 231 has been assigned to the three VMs 110-1, 110-2, 110-N. The assignment of the disk 231 may be performed by pointing or directing the VM 110-1, 110-2, 110-N to the location of the virtual disk 231 on the storage device 250, without necessarily moving the virtual disk 231 to a different physical location or making copies of the virtual disk 231. In this way, a single ASV 231 may be assigned to any number of VMs (e.g., 110-1, 110-2, 110-N) quickly and efficiently.

In various embodiments, the ASV 231 is read-only, which can facilitate assigning it to multiple VMs 110-1, 110-2, 110-N simultaneously. Accordingly, application 241 data that is produced by a VM 110-1, 110-2, 110-N during execution of the application 241 is written to a different location, such as a write disk. Such write disks can be created for each VM and each write disk may contain the changes caused during execution of the application on its respective VM.

As will be appreciated by those skilled in the art, while the example of FIG. 2 illustrates a single ASV 231 with a single application 241, a typical enterprise environment would include a library of several ASVs, each containing one or a number of applications. A typical environment would also contain hundreds or thousands of VMs and each ASV may also be assigned to any number of VMs. An administrator may be able to view a list of all the available applications and ASVs via an interface on the ASV manager 202 and assign the applications and ASPs to any VMs on the network via the interface.

However, as discussed above, these systems are vulnerable to certain failures. For example, when a mounted application (e.g., 242-1, 242-2, 242-N) is executing, if there is a failure accessing the ASV 231 by the VM (e.g., 110-1, 110-2, 110-N), the application (e.g., 242-1, 242-2, 242-N) running from the ASV 231 may crash, become unavailable, until the ASV 231 is recovered, and loss of application data may result. This may occur in cases of failure of the storage device 250, inaccessibility of the storage device 250, corruption of the ASV 231, or any other failure making the ASV 231 unavailable.

As will be discussed in the following figures, to prevent failures in these situations, the agent 203-1, 203-2, 203-N can detect failure of the ASV 231 or storage device 250 before the failure is identified by applications 242-1, 242-2, 242-N running from the ASV 231, and apply various techniques to prevent the application from terminating. In various embodiments, the agent 203-1, 203-2, 203-N may implement suspend and resume techniques to avoid failures in these types of scenarios. In various other embodiments, the agent 203-1, 203-2, 203-N may implement forking techniques to avoid failures in these types of scenarios.

Figure 3:
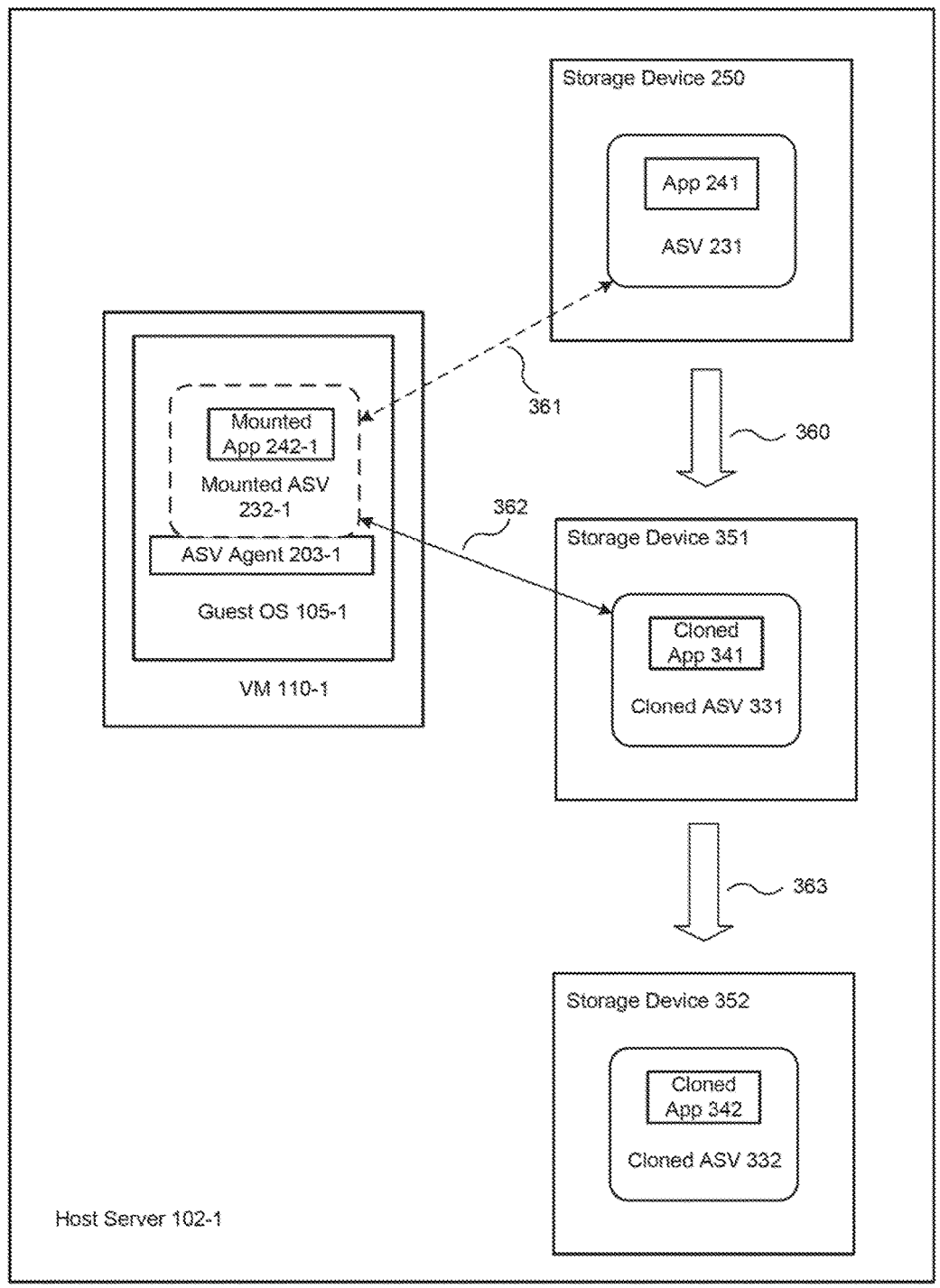
FIG. 3 illustrates an example architecture of a system for application storage volume fault tolerance using suspend and resume techniques, in accordance with various embodiments.

FIG. 3 illustrates an example architecture of a system for application storage fault tolerance using suspend and resume techniques, in accordance with various embodiments. The example of FIG. 3, illustrates several components that were described with respect to FIGS. 1 and 2, including the host server 102-1 that hosts the VM 110-1 where the agent 203-1 executes in the guest OS 105-1, and an ASV 231 containing an application 241 that is stored on a storage device 250, which ASV 231 is mounted on the VM 110-1 such that mounted application 242-1 in the mounted ASV 232-1 can execute from the ASV 231 on the storage device 250 as if it was natively installed.

Once the fault tolerance feature is turned on or requested for the ASV 231, the ASV 231 is cloned to a second storage device 351 (as illustrated by arrow 360) to create a duplicate virtual disk such that a cloned ASV 331 ("secondary" or "backup" ASV) containing a cloned application 341 is contained in the storage device 351. In various embodiments, storage device 351 can be a physically separate disk array or SSD from the storage device 250 so that failure of one storage device (e.g., 250 or 351) does not result in the failure of both ASV 231 and backup ASV 331.

As described previously, the fault tolerance feature may be turned on by an administrator (e.g., via the ASV manager 202).

In some cases, after the backup virtual disk 331 is created, the ASV 231 that is attached to the VM 110-1 may be updated or modified. For example, the administrator might modify or update the ASV 231 and the modified/updated ASV may be assigned to the VM 110-1. In this case, the system can update the backup virtual disk 331 in order to ensure that the backup ASV 331 and the assigned ASV 231 are consistent. For example, the agent 203-1 can be configured to detect when an assigned ASV 231 is modified or an updated version is assigned and in turn update any backup of the ASV (e.g., 331) to be consistent with the assigned ASV 231.

Thus, in various embodiments, once the fault tolerance feature is enabled, the ASV 231 can be cloned to another storage device 351 and the cloned ASV 131 may be maintained in the storage device 351 in case of failure of storage device 250 and/or failure of ASV 231. In various embodiments, the system can be configured to detect a failure of the storage device 250 or ASV 231 before the application 241 running on the ASV 231 detects the failure and is detrimentally affected (such as by crashing). For example, during execution of the mounted application 242-1 on the VM 110-1 (e.g., when a user of client device 120-1 uses the application 242-1) the agent 203-1 can monitor the storage device 250 and ASV 231 to detect a failure of the storage device 250 and/or ASV 231 before the application 242-1 detects the failure.

Various techniques can be used to detect a failure of the storage device 250 and/or ASV 231 before the application 242-1 is affected. For example, various polling mechanisms can be used on a continuous basis during execution of the application 242-1 to detect if there is a failure of the ASV 231 and/or storage device 250. Such polling mechanisms can be configured such that an expected response is received from the ASV 231 and/or storage device 250 on a periodic basis, e.g., at predetermined timing intervals. If an expected response is not received at an expected time, then the ASV 231 and/or storage device 250 can be deemed to have failed and the system can initiate the preservation mechanism to shift the system to the backup ASV 331.

In some embodiments, the system (e.g., via the agent 203-1) can perform ongoing checks to ensure that the storage device 250 is accessible, in order to detect when there is a failure. For example, the system (e.g., via the agent 203-1) can employ a polling technique for detecting when there is a problem accessing the storage device 250.

In some embodiments, the system (e.g., via the agent 203-1) can perform ongoing checks to ensure that data in the ASV 231 is not corrupt, in order to detect when there is a failure of the ASV 231. For example, the system (e.g., via the agent 203-1) can monitor the information retrieved from the application 242-1 (or the system can monitor all data retrieved from the ASV 231) during runtime and ensure that the retrieved information is consistent with what information is expected. Inconsistency of the information may indicate ASV 231 corruption. To determine whether the information retrieved during runtime is consistent with what is expected, the agent 203-1 can perform the following process: When the application 242-1 makes a query during runtime, the agent 203-1 can, in parallel, determine what the expected response to the query should be by retrieving information from another copy of the application located elsewhere than the ASV 231. For example, the other copy of the application 241 may have been created when the application 241 was installed on a designated VM for the purpose of capturing the ASV 231, as described above. In this case, the agent 203-1 may be able to query the ASV manager 202 in order to determine what the expected response to the query should be. Further, if the comparison goes through successfully, the agent 203-1 can treat the information as baseline data for the ASV 231 for further detection of data corruption.

In various embodiments, the agent 203-1 can perform a two-step process for detecting an ASV 231 failure at frequent intervals. First, the agent 203-1 can ensure that the storage device 250 is accessible, as described above. If, and only if, this first check is successful, then the agent can ensure that there is no data corruption in the ASV 231, as described above. If either of the tests fails, then the ASV 231 and/or storage device 250 may be deemed to have failed and the system can proceed with implementing a fault tolerance mechanism.

In various embodiments, if an application storage volume 231 or device 250 failure is detected (e.g., by the agent 203-1), the agent 203-1 can suspend the application 242-1 running from the application storage volume 231 and redirect the application 242-1 to the secondary application storage volume 331 in storage device 351. In the example of FIG. 3, the broken arrow 361 indicates the failure of the ASV 231 and/or storage device 250, and arrow 362 indicates the redirection of the application 242-1 to the secondary ASV 331. Once, the redirection is performed, the application 242-1 cab be resumed, which returns it to its previous running state with previous data preserved.

For example, when the fault tolerance feature is enabled, the agent 203-1 may be notified of the location of the secondary ASV 331 by the system (e.g., by the ASV manager 203). Upon detection of a failure of the primary ASV 231, the agent 203-1, with knowledge of the secondary ASV's 331 location, can simply mounts it to the VM 110-1; after gracefully or forcefully unmounting the primary ASV 231. For example, the redirection may be performed by remapping the paths of the ASVs 231, 331 such that the path of the primary ASV 231 is replaced with the path of the secondary ASV 331.

In various embodiments, the application 242-1 can be suspended by suspending the processes of the application 242-1 without terminating the application, and the application 242-1 can be resumed by subsequently allowing the processes to resume. Generally, application suspend and resume is a standard function available in operating systems and this function can be utilized by the system (e.g., by the agent 203-1) in various embodiments (e.g., by making a request to the guest OS 105-1) to suspend and resume the application (e.g., 242-1). In various embodiments, the application itself 241 may have a suspend and resume function available that may be utilized by the system as well.

The user may experience a slight delay in accessing the application 242-1 during the process due to the suspend and resume operation but she may otherwise be unaware of the processes taking place.

Further, in various embodiments, when ASV 231 fails and ASV 331 is brought online in its place, in order to ensure that another backup of the application storage volume is available in case of failure of ASV 331, the system can produce a second backup clone ASV 332 with cloned application 342 and store it in a separate storage device 352 (as illustrated by arrow 363). For example, the agent 203-1 can create the backup 332 of the current application storage volume 331 and store it in storage device 352. Hence, if failure of the secondary application storage volume 331 is detected, the application 242-1 can be suspended, redirected to the subsequent backup 332, and resumed, in a similar manner as described above in the case of failure of ASV 231.

Thus, in various embodiments, once the failure of ASV 231 is detected and ASV 331 is brought online in its place, if another storage device (e.g., 352) is available, the agent 203-1 can create the backup 332 of the current disk 331 to ensure the availability of an ASV for future failures. Further, if the failed ASV 231 reconnects before the process of creating another backup 332 is completed, the ASV 231 may be treated as a secondary/backup ASV and the cloned ASV 331 may remain the primary ASV. On the other hand, if the failed ASV 231 reconnects after the process of creating the new secondary/backup ASV 332 is completed, it can either be retained (for future usage as another backup) or it can be destroyed (e.g., the particular treatment of the ASV in this case may be determined by a user or by an administrator by adjusting system settings).

To provide another illustration of the concepts described above, consider a scenario where a primary ASV containing three applications is mounted to a VM to make the applications available to a user accessing the VM via a remote client device. For example, the applications may be a web browser such as Firefox available from the Mozilla Foundation, a PDF Reader such as Adobe PDF Reader available from Adobe Systems Inc., and a programming application such as Java available from Oracle Corporation. If the fault tolerance feature has been enabled (e.g., by the user or by an administrator), a backup of the ASV is created on a separate storage device from the primary ASV. Assume further that, for example, due to backend storage issues, connectivity to the primary ASV is lost. In this case, the agent on the VM detects the loss of primary ASV before any of the applications and suspends the running applications i.e. FireFox, Adobe PDF Reader, and Java applications. Upon detecting the failure, the agent can suspend any applications running from the primary ASV (e.g., if all three applications are running, then all three would be suspended). The agent then redirects the VM to the secondary ASV. Once the backup ASV is successfully attached to the operating system of the VM, the FireFox, Adobe PDF Reader, and Java applications can be resumed. The resumed applications may have the same process identifier (ID) and may continue to function as if there was no failure. Further, the agent can create another backup of the current ASV (preferably on a separate storage device).

Figure 4:
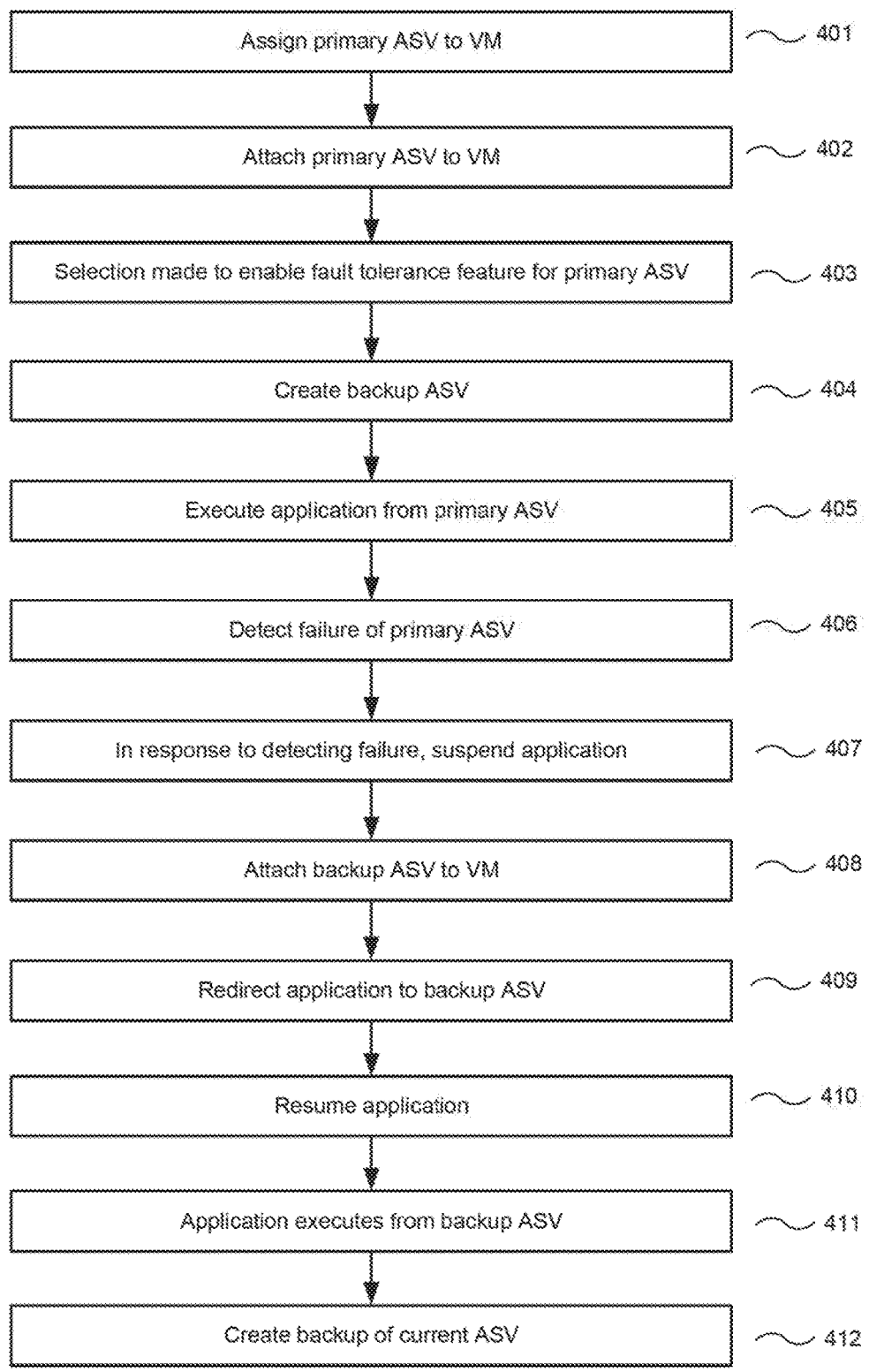
FIG. 4 illustrates an example process flow for application storage volume fault tolerance using suspend and resume techniques, in accordance with various embodiments.

FIG. 4 illustrates an example process flow for application storage volume fault tolerance, using suspend and resume techniques, in accordance with various embodiments. As illustrated in the example process flow of FIG. 4, a primary ASV is assigned to a VM in operation 401. For example, an administrator can access an ASV manager (e.g., 203) and view, through an interface to the ASV manager, a list of assignable ASVs, each ASV containing one or more applications. Consequently, the administrator can select an ASV from the list and identify to which endpoints or VMs on the network the ASV should be assigned. In operation 401, the primary ASV is assigned to a particular VM. The same ASV may also be assigned to several other VMs at the same time or at a later time. The assigned ASV in operation 401 may contain one application or several applications. For example, in this case we can assume that the assigned ASV contains three applications, Firefox, Adobe PDF Reader, and Java.

In operation 402, the primary ASV is attached to the VM. For example, an agent (e.g., 203-1) operating on the VM can mount the ASV virtual disk on the VM. After the ASV is mounted, the applications on the ASV (Firefox, Adobe PDF Reader, and Java) may become available to a user accessing the VM via a remote client device. For example, in some embodiments, the applications may become available instantly, in other embodiments the applications may become available at the next user login.

In operation 403, a selection is made to enable the fault tolerance feature for the assigned ASV. For example, the administrator can enable the feature via the ASV manager interface or the user of the VM can make the selection via an interface on the remote client device accessing the VM. In some cases, for example because the user may not be able to turn the fault tolerance feature on herself when an ASV is assigned, the user can make a request, that is received by the administrator to turn on the fault tolerance feature. As will be appreciated by those skilled in the art, the selection to enable or subsequently disable the fault tolerance feature may be made at different times, e.g., after the ASV has already been in use for some time or before the ASV is attached, or the feature may be enabled by default in certain cases.

After the selection to enable the fault tolerance feature is made, a backup or secondary ASV is created in operation 404. For example, the primary ASV virtual disk can be cloned to produce the secondary backup ASV. In various embodiments, the secondary ASV can be cloned to a separate storage device.

In operation 405, an application is executed from the ASV. For example, one of the Firefox, Adobe PDF Reader, and Java applications may be executed from the primary ASV when a user of the remote device accessing the VM uses the application. As described above, the application may appear to the user as if it is executing natively on the VM, while it is actually executing from the primary ASV. In operation 406, a failure of the primary ASV is detected. For example, the agent can detect the failure. As discussed above, various techniques can be used to detect the failure before the failure is identified by the application.

In operation 407, in response to the detected ASV failure, the application executing from the primary ASV is suspended. For example, the application may be suspended by the agent by invoking a standard function of the guest OS (e.g., 105-1).

In operation 408, the backup ASV is attached to the VM. For example, the agent can unmount the primary ASV and mount the backup ASV. In operation 409, the application is redirected to the backup ASV. For example, the agent can perform the redirection of the application to the backup ASV by remapping paths as necessary. In operation 410, the application is resumed. For example, the application may be resumed by the agent by invoking a standard function of the guest OS (e.g., 105-1).

In operation 411, the application executes from the backup ASV. The resumed application may have the same process identifier (ID) and may continue to function as if there was no failure. In operation 412, a backup of the current ASV is created (preferably on a separate storage device). For example, the agent working together with the ASV manager can clone the secondary ASV to another storage device to produce the backup, which can be used to preserve the application in case another failure, this time of the secondary ASV, is detected.

As mentioned, in various embodiments a process forking technique can be used instead of a suspend-resume technique to preserve an application in case of an ASV failure. With the forking technique, in event of a detected primary ASV failure, a new child application process, which is a copy of the parent application process, is quickly created from the parent application process. The parent process in this case is the initial application process that refers to the primary, now failing, ASV virtual disk. Different methods are well known for forking an application process. For example, some operating systems contain forking operations as a standard function of the OS, which may be implemented through a system call, whereby a process creates a copy of itself. In various embodiments, such system calls can be used to fork the application process when creating a child process from the parent process. In a preferred embodiment, a technique known as vfork can be used to fork the application process.

In various embodiments, the child and parent application processes can share the same virtual address space, ASV, ASV pointer, and instruction pointer. The child application process can start running after the parent application process freezes (or is suspended), with the child process retaining all the current application cache. Further, before the child application process starts running, the system (e.g., via the agent) can attach and mount the secondary ASV virtual disk to the VM. This way, when the child application process starts running, it is directed to a healthy ASV disk (i.e., the secondary ASV disk).

Further, any required changes may be performed so that the child process is able to run in an identical state (using and referring to the same data structures, including memory bitmap and contents of the application memory) to the parent from the secondary ASV, once it is attached. Hence, when the child process begins running, it can run with the memory content that the parent application process had saved, providing uninterrupted access to the application.

Further, when the child process is initiated, the parent process can be suspended or frozen. In the backend, the earlier frozen or suspended parent application process may be eventually killed, as it is no longer used, without affecting the child application process in any way. This may be done to ensure that un-used application processes, which point to failed or corrupted ASV disks, are removed or terminated.

In various embodiments, the overall operation described above can happen so quickly that end users who are accessing the application would not notice any behavioral change or be aware that there was a failure of the ASV. This approach may be best suited for business critical applications where any delay whatsoever is not tolerable or acceptable, such as always-on healthcare applications.

Figure 5:
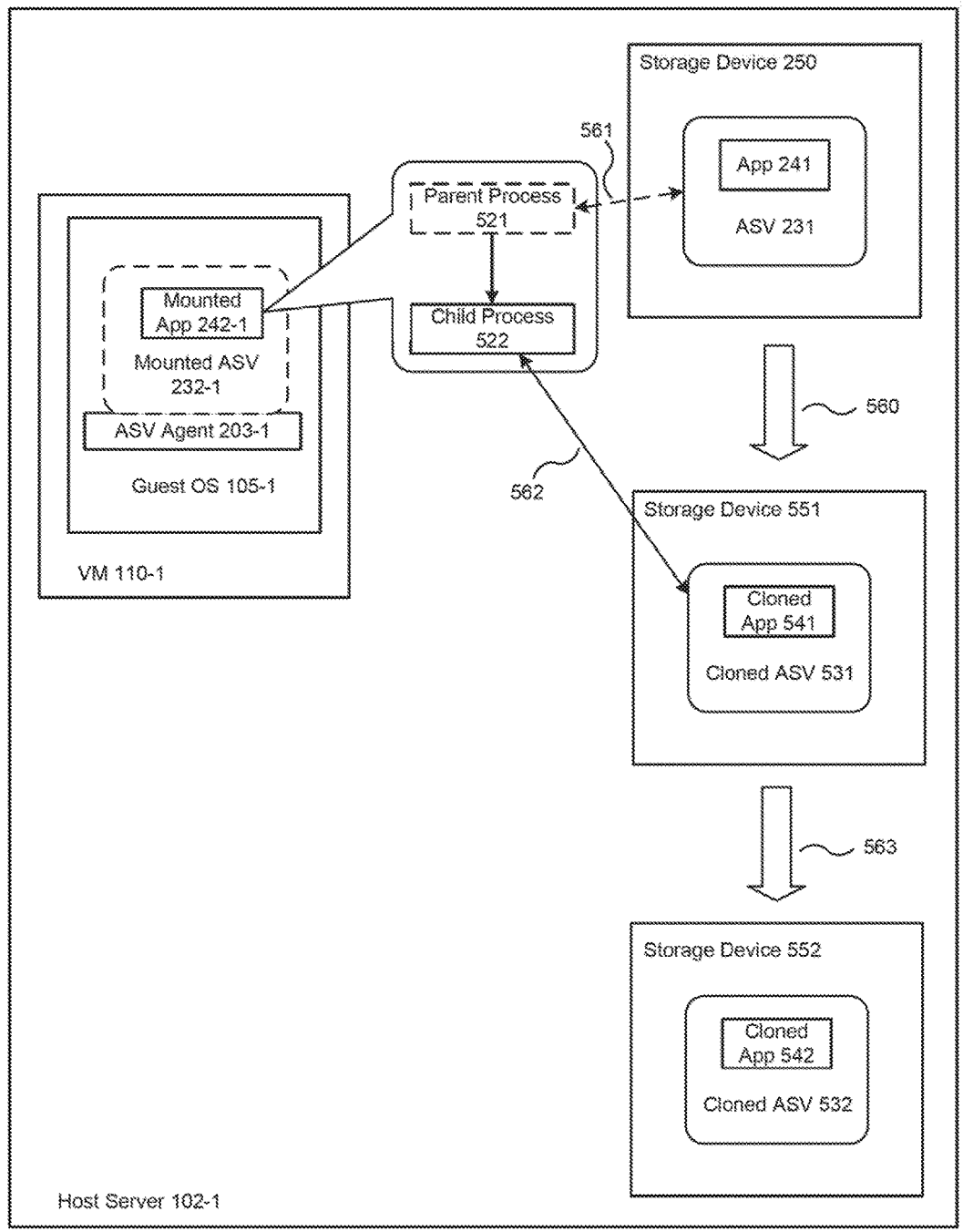
FIG. 5 illustrates an example architecture of a system for application storage volume fault tolerance using forking techniques, in accordance with various embodiments.

FIG. 5 illustrates an example architecture of a system for application storage volume fault tolerance using forking techniques, in accordance with various embodiments. The example of FIG. 5, illustrates several components that were described with respect to FIGS. 1 and 2, including the host server 102-1 that hosts the VM 110-1 where the agent 203-1 executes in the guest OS 105-1, and an ASV 231 containing an application 241 that is stored on a storage device 250, which ASV 231 is mounted on the VM 110-1 such that mounted applications 242-1 in the mounted ASV 232-1 can execute from the ASV 231 on the storage device 250 as if it was natively installed.

Once the fault tolerance feature is turned on or requested for the ASV 231, the ASV 231 is cloned to a second storage device 551 (as illustrated by arrow 560) to create a duplicate virtual disk such that a cloned ASV 531 ("secondary" or "backup" ASV) containing a cloned application 541 is contained in the storage device 551. In various embodiments, storage device 551 can be a physically separate disk array or SSD from the storage device 250 so that failure of one storage device (e.g., 250 or 551) does not result in the failure of both ASV 231 and backup ASV 531.

As described previously, the fault tolerance feature may be turned on by an administrator (e.g., via the ASV manager 202). In some cases, for example because the user, may not be able to turn the fault tolerance feature on herself immediately when an ASV is assigned, the user can make a request that is received by the administrator to turn on the fault tolerance feature.

In some cases, after the backup virtual disk 551 is created, the ASV 231 that is attached to the VM 110-1 may be updated or modified. For example, the administrator might modify or update the ASV 231 and the modified/updated ASV may be assigned to the VM 110-1. In this case, the system can update the backup virtual disk 531 in order to ensure that the backup ASV 531 and the assigned ASV 231 are consistent. For example, when an assigned ASV 231 is modified or an updated version is assigned, the ASV manager may in turn update any backup of the ASV (e.g., 531) to be consistent with the assigned ASV 231.

Thus, in various embodiments, once the fault tolerance feature is enabled, the ASV 231 can be cloned to another storage device 551 and the cloned ASV 531 may be maintained in the storage device 551 in case of failure of storage device 250 and/or failure of ASV 231. In various embodiments, the system can be configured to detect a failure of the storage device 250 or ASV 231 before the application 241 running on the ASV 231 detects the failure and is detrimentally affected (such as by crashing). For example, during execution of the mounted application 242-1 on the VM 110-1 (e.g., when a user of client device 120-1 uses the application 242-1) the agent 203-1 can monitor the storage device 250 and ASV 231 to detect a failure of the storage device 250 and/or ASV 211 before the application 242-1 detects the failure.

Various techniques can be used to detect a failure of the storage device 250 and/or ASV 231 before the application 242-1 is affected. For example, various polling mechanisms can be used on a continuous basis during execution of the application 242-1 to detect if there is a failure of the ASV 231 and/or storage device 250. Such polling mechanisms can be configured such that an expected response is received from the ASV 231 and/or storage device 250 on a periodic basis, e.g., at predetermined timing intervals. If an expected response is not received at an expected time, then the ASV 231 and/or storage device 250 can be deemed to have failed and the system can initiate the preservation mechanism to shift the system to the backup ASV 531.

In some embodiments, the system (e.g., via the agent 203-1) can perform ongoing checks to ensure that the storage device 250 is accessible, in order to detect when there is a failure. For example, the system (e.g., via the agent 203-1) can employ a polling technique for detecting when there is a problem accessing, the storage device 250.

In some embodiments, the system (e.g., via the agent 203-1) can perform ongoing checks to ensure that data in the ASV 231 is not corrupt, in order to detect when there is a failure of the ASV 231. For example, the system (e.g., via the agent 203-1) can monitor the information retrieved from the application 242-1 (or the system can monitor all data retrieved from the ASV 231) during runtime and ensure that the retrieved information is consistent with what information is expected. Inconsistency of the information may indicate ASV 231 corruption. To determine whether the information retrieved during runtime is consistent with what is expected, the agent 203-1 can perform the following process: When the application 242-1 makes a query during runtime, the agent 203-1 can, in parallel, determine what the expected response to the query should be by retrieving information from another copy of the application located elsewhere than the ASV 231. For example, the other copy of the application 241 may have been created when the application 241 was installed on a designated VM for the purpose of capturing the ASV 231, as described above. In this case, the agent 203-1 may be able to query the ASV manager 202 in order to determine what the expected response to the query should be. Further, if the comparison goes through successfully, the agent 203-1 can treat the information as baseline data for the ASV 231 for further detection of data corruption.

In various embodiments, the agent 203-1 can perform a two-step process for detecting an ASV 231 failure at frequent intervals. First, the agent 203-1 can ensure that the storage device 250 is accessible, as described above. If, and only if this first check is successful, then the agent can ensure that there is no data corruption in the ASV 231, as described above. If either of the tests fails, then the ASV 231 and/or storage device 250 may be deemed to have failed and the system can proceed with implementing a fault tolerance mechanism.

Initially, the application 242-1 may be running in a certain process of execution, the "parent" process 521. In various embodiments, if an application storage volume 231 or device 250 failure is detected (e.g., by the agent 203-1), the agent 203-1 can spin a child process 522 off from the parent process 521 using a forking technique (e.g., vfork), as previously described. In the forking process, the parent process 521 may be suspended (as indicated by the dashed outline of the process 521) and the duplicate child process 522 may be created. Before the child process 522 is started (in other words, before the application 242-1 is resume with the child process 522), the backup ASV 531 can be attached and the child process 522 can be directed to the backup ASV 531 in the storage device 551. As described above, the child process 522 can start running in an identical state as the parent process 521 using and referring to the same data structures, including memory bitmap and contents of the application memory as the parent process 521. Hence, the child process 522 can be started and begin to run with the memory content that the parent application process 521 had saved, providing uninterrupted access to the application 242-1.

In the example of FIG. 5, the broken arrow 561 indicates the failure of the ASV 231 and/or storage device 250, and arrow 562 indicates the redirection of the child process 522 to the secondary ASV 531.

In the backend, after the forking operation is complete, the earlier frozen or suspended parent application process 521 may be killed, as it is no longer used, without affecting the child application process 522 in any way. This may be done to ensure that un-used application processes, which point to failed or corrupted ASV disks (e.g., 231), are removed or terminated.

When the fault tolerance feature is enabled, the agent 203-1 may be notified of the location of the secondary ASV 531 by the system (e.g., by the ASV manager 202). Upon detection of a failure of the primary ASV 231, the agent 203-1, with knowledge of the secondary ASV's 531 location, can simply mounts it to the VM 110-1; after gracefully or forcefully unmounting the primary ASV 231. For example, the redirection may be performed by remapping the paths of the ASVs 231, 531 such that the child process 522 is directed to the secondary ASV 531.

Generally, application suspend and resume is a standard function available in operating systems and this function can be utilized by the system (e.g., by the agent 203-1) in various embodiments (e.g., by making a request to the guest OS 105-1) to suspend and resume the application (e.g., 242-1). In various embodiments, the application itself 241 may have a suspend and resume function available that may be utilized by the system as well.

Further, in various embodiments, when ASV 231 fails and ASV 531 is brought online in its place, in order to ensure that another backup of the application storage volume is available in case of failure of ASV 531, the system can produce a second backup clone ASV 532 with cloned application 542 and store it in a separate storage device 552 (as illustrated by arrow 563). For example, the agent 203-1 can create the backup 532 of the current application storage volume 531 and store it in storage device 552. Hence, if failure of the secondary application storage volume 531 is detected, the application 242-1 can be suspended, redirected to the subsequent backup 532, and resumed, in a similar manner as described above in the case of failure of ASV 231.

Thus, in various embodiments, once the failure of ASV 231 is detected and ASV 531 is brought online in its place, if another storage device (e.g., 552) is available, the agent 203-1 can create the backup 532 of the current disk 531 to ensure the availability of an ASV for future failures. Further, if the failed ASV 231 reconnects before the process of creating another backup 532 is completed, the ASV 231 may be treated as a secondary/backup ASV and the cloned ASV 531 may remain the primary ASV. On the other hand, if the failed ASV 231 reconnects after the process of creating a new secondary/backup ASV 532 is completed, it can either be retained (for future usage as another backup) or it can be destroyed (e.g., the particular treatment of the ASV in this case may be determined by an administrator by adjusting system settings).

To provide another illustration of the process described above, consider a scenario where a primary ASV containing three applications is mounted to a VM to make the applications available to a user accessing the VM via a remote client device. For example, the applications may be a web browser such as Firefox available from the Mozilla Foundation, a PDF Reader such as Adobe PDF Reader, available from Adobe Systems Inc., and a programming application such as Java available from Oracle Corporation. If the fault tolerance feature has been enabled (e.g., by the user or by an administrator), a backup of the ASV is created on a separate storage device from the primary ASV. Assume further that, for example, due to backend storage issues, connectivity to the primary ASV is lost. In this case, the agent on the VM detects the loss of primary ASV before any of the applications and suspends the running applications i.e. FireFox, Adobe PDF Reader, and Java applications. Upon detecting the failure, the agent can fork the parent processes of any running applications to produce child processes, mount the secondary ASV, and redirect the child processes to the ASV such that the child processes can start in the same state as the parent process. Once the backup ASV is successfully attached to the operating system of the VM and the child processes are created, the applications can be resumed. The resumed applications may continue to function as if there was no failure. The child application process may be assigned a different process identifier (ID) from the parent application process. The child application process may inherit an identical memory state of the application to the parent application process. Further, the agent working together with the ASV manager can create another backup of the current ASV (preferably on a separate storage device).

Figure 6:
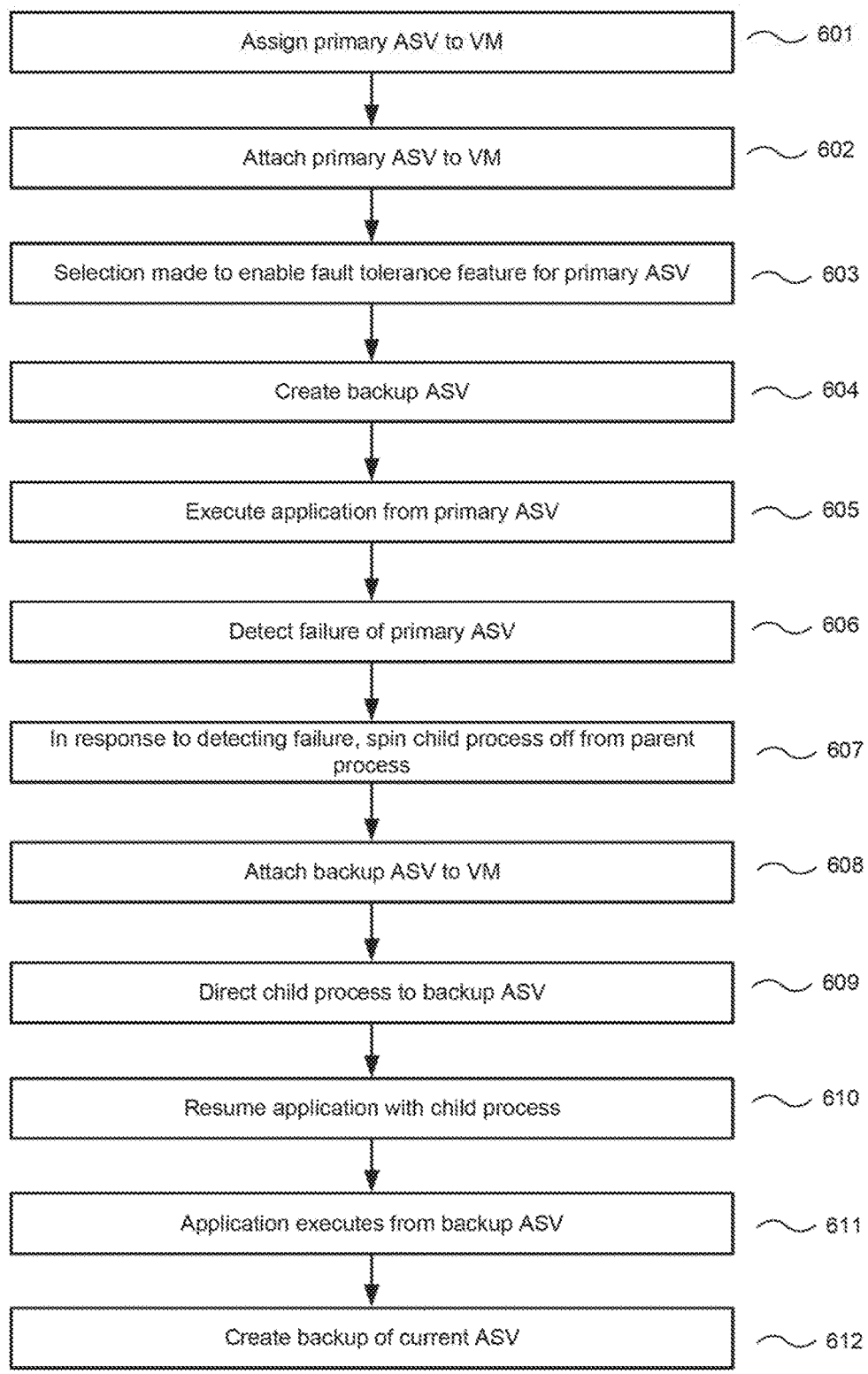
FIG. 6 illustrates an example process flow for application storage volume fault tolerance using forking techniques, in accordance with various embodiments.

FIG. 6 illustrates an example process flow for application storage volume fault tolerance using forking techniques, in accordance with various embodiments. As illustrated in the example process flow of FIG. 6, a primary ASV is assigned to a VM in operation 601. For example, an administrator can access an ASV manager (e.g., 203) and view, through an interface to the ASV manager, a list of assignable ASPs, each ASV containing one or more applications. Consequently, the administrator can select an ASV from the list and identify to which endpoints or VMs on the network the ASV should be assigned. In operation 601, the primary ASV is assigned to a particular VM. The same ASV may also be assigned to several other VMs at the same time or at a later time. The assigned ASV in operation 601 may contain one application or several applications. For example, in this case we can assume that the ASV contains three applications, Firefox, Adobe PDF Reader, and Java.

In operation 602, the primary ASV is attached to the VM. For example, an agent (e.g., 203-1) operating on the VM can mount the ASV virtual disk on the VM. After the ASV is mounted, the applications on the ASV (Firefox, Adobe PDF Reader, and Java) may become available to a user accessing the VM via a remote client device. In some embodiments, the applications may become available instantly, in other embodiments the applications may become available at the next user login.

In operation 603, a selection is made to enable the fault tolerance feature for the assigned ASV. For example, the administrator can enable the feature via the ASV manager interface or the user of the VM can make the selection via an interface on the remote client device accessing the VM. In some cases, for example because the user may not be able to turn the fault tolerance feature on herself immediately when an ASV is assigned, the user can make a request that is received by the administrator to turn on the fault tolerance feature. As will be appreciated by those skilled in the art, the selection to enable or subsequently disable the fault tolerance feature may be made at different times, e.g., after the ASV has already been in use for some time or before the ASV is attached, or the feature may be enabled by default in certain cases.

After the selection to enable the fault tolerance feature is made, a backup or secondary ASV is created in operation 604. For example, the primary ASV virtual disk can be cloned to produce the secondary backup ASV. In various embodiments, the secondary ASV can be cloned to a separate storage device.

In operation 605, an application is executed from the ASV. For example, one of the Firefox, Adobe PDF Reader, and Java applications may be executed from the primary ASV when a user of the remote device accessing the VM uses the application. As described above, the application may appear to the user as if it is executing natively on the VM, while it is actually executing from the primary ASV.

In operation 606, a failure of the primary ASV is detected. For example, the agent can detect the failure. As discussed above, various techniques can be used to detect the failure before the failure is identified by the application. In operation 607, in response to the detected ASV failure, a child process is spun off from the parent application process using a forking technique. The parent process is suspended during the forking process, and the parent process may be killed after the child process is successfully created.

In operation 608, the backup ASV is attached to the VM. For example, the agent can unmount the primary ASV and mount the backup ASV. In operation 609, the child process is directed to the backup ASV. For example, the agent can map any paths as necessary for the child process to be able to start from the backup ASV in an identical state to the parent process. In operation 610, the application is resumed with the child process. For example, the application may be resumed by the agent by invoking a standard resume function of the guest OS (e.g., 105-1). In operation 611, the application executes horn the backup ASV via the child process.

The resumed application may continue to function as if there was no failure. The child application process may be assigned a different process identifier (ID) from the parent application process. The child application process may inherit an identical memory state of the application to the parent application process.

In operation 612, a backup of the current ASV is created (preferably on a separate storage device). For example, the agent working together with the ASV manager can clone the secondary ASV to another storage device to produce the backup, which can be used to preserve the application in case another failure, this time of the secondary ASV, is detected.

Figure 7:
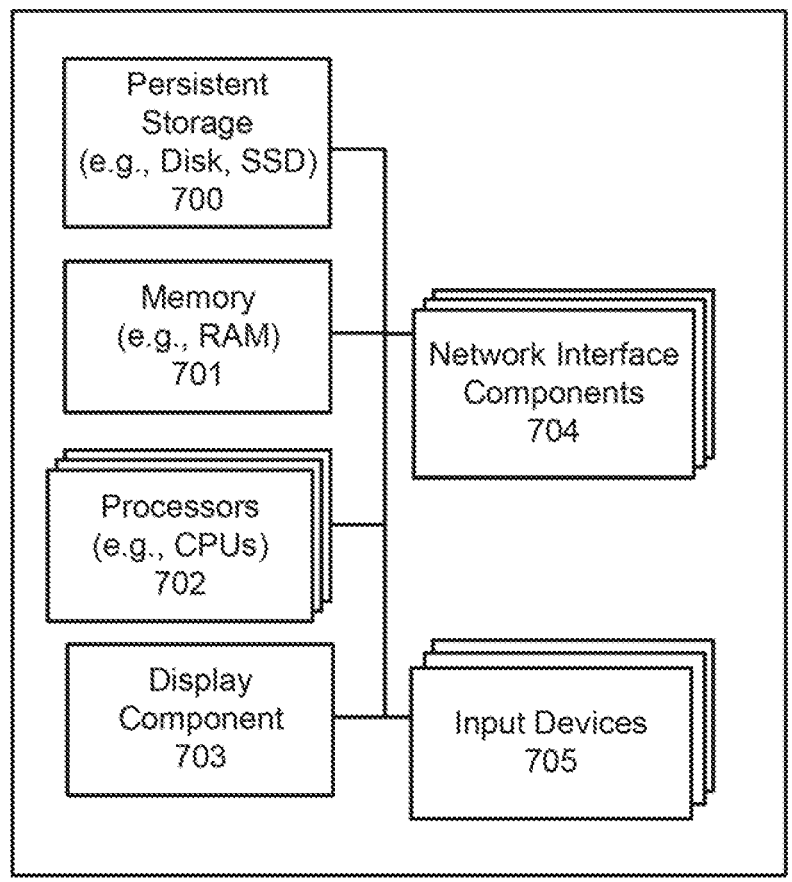
FIG. 7 illustrates an example of some general components of a computing device, in accordance with various embodiments.

FIG. 7 illustrates an example of some general components of a computing device, in accordance with various embodiment. In this particular example, the device includes one of more processors (e.g., central processing units (CPUs) 702 for executing instructions that can be stored in a storage medium component. The storage medium can include many types of memory, persistent data storage, or non-transitory, computer-readable storage media. For example, the storage medium may take the form of random access memory (RAM) 701 storing program instructions for execution by the processor(s) 702, a persistent storage (e.g., disk or SSD) 700, a removable memory for sharing information with other devices and/or the like. The computing device typically can further comprise a display component 703, such as a monitor, a touch screen, liquid crystal display (LCD), or the like. In various embodiments, the computing device will include at least one input device 705 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 704 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaining systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including, storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for fault tolerant delivery of an application to a virtual machine (VM) being executed by a server in a remote desktop environment using application storage volumes, comprising:
   delivering the application to the VM by attaching a primary application storage volume (ASV) containing components of the application to the VM;
   cloning the primary ASV to create a backup ASV;
   executing the application on the VM from the primary ASV;
   monitoring the primary ASV to detect failures;
   detecting a failure of the primary ASV;
   in response to the detecting the failure of the primary ASV, suspending execution of the application;
   attaching the backup ASV to the VM; and
   resuming the execution of the application from the backup ASV by redirecting operating system calls accessing the application to the backup ASV.

2. The method of claim 1, wherein the primary ASV is stored on a first storage device and the backup ASV is stored in a second storage device separate from the first storage device.

3. The method of claim 1, wherein the redirecting the application to the backup ASV comprises replacing a path to the primary ASV with a path to the backup ASV.

4. The method of claim 1, wherein the monitoring the primary ASV comprises employing a polling technique for detecting when there is a problem accessing a storage device on which the primary ASV is located.

5. The method of claim 1, wherein the monitoring the primary ASV comprises monitoring information retrieved from the primary ASV during runtime and ensuring that the retrieved information is consistent with what information is expected.

6. The method of claim 1, wherein the failure of the primary ASV is detected before the application is capable of detecting the failure.

7. The method of claim 1, wherein resuming the application retains the same process identifier (ID) of an application process that was used before suspending the execution of the application.

8. A computing device for fault tolerant delivery of an application to a virtual machine (VM) being executed by a server in a remote desktop environment using application storage volumes, comprising:
   at least one processor; and
   memory including instructions that, when executed by the at least one processor, cause the computing device to perform the steps of:
      delivering the application to the VM by attaching a primary application storage volume (ASV) containing components of the application to the VM;
      cloning the primary ASV to create a backup ASV;
      executing the application on the VM from the primary ASV;
      monitoring the primary ASV to detect failures;
      detecting a failure of the primary ASV;
      in response to the detecting the failure of the primary ASV, suspending execution of the application;
      attaching the backup ASV to the VM; and
      resuming the execution of the application from the backup ASV by redirecting operating system calls accessing the application to the backup ASV.

9. The computing device of claim 8, wherein the primary ASV is stored on a first storage device and the backup ASV is stored in a second storage device separate from the first storage device.

10. The computing device of claim 8, wherein the redirecting the application to the backup ASV comprises replacing a path to the primary ASV with a path to the backup ASV.

11. The computing device of claim 8, wherein the monitoring the primary ASV comprises employing a polling technique for detecting when there is a problem accessing a storage device on which the primary ASV is located.

12. The computing device of claim 8, wherein the monitoring the primary ASV comprises monitoring information retrieved from the primary ASV during runtime and ensuring that the retrieved information is consistent with what information is expected.

13. The computing device of claim 8, wherein the failure of the primary ASV is detected before the application is capable of detecting the failure.

14. The computing device of claim 8, wherein resuming the application retains the same process identifier (ID) of an application process that was used before suspending the execution of the application.

15. A non-transitory computer readable storage medium for fault tolerant delivery of an application to a virtual machine (VM) being executed by a server in a remote desktop environment using application storage volumes, comprising one or more sequences of instructions, the instructions when executed by one or more processors causing the one or more processors to execute the operations of:
   delivering the application to the VM by attaching a primary application storage volume (ASV) containing components of the application to the VM;
   cloning the primary ASV to create a backup ASV;
   executing the application on the VM from the primary ASV;
   monitoring the primary ASV to detect failures;
   detecting a failure of the primary ASV;
   in response to the detecting the failure of the primary ASV, suspending execution of the application;
   attaching the backup ASV to the VM; and
   resuming the execution of the application from the backup ASV by redirecting operating system calls accessing the application to the backup ASV.

16. The non-transitory computer readable storage medium of claim 15, wherein the primary ASV is stored on a first storage device and the backup ASV is stored in a second storage device separate from the first storage device.

17. The non-transitory computer readable storage medium of claim 15, wherein the redirecting the application to the backup ASV comprises replacing a path to the primary ASV with a path to the backup ASV.

18. The non-transitory computer readable storage medium of claim 15, wherein the monitoring the primary ASV comprises employing a polling technique for detecting when there is a problem accessing a storage device on which the primary ASV is located.

19. The non-transitory computer readable storage medium of claim 15, wherein the monitoring the primary ASV comprises monitoring information retrieved from the primary ASV during runtime and ensuring that the retrieved information is consistent with what information is expected.

20. The non-transitory computer readable storage medium of claim 15, wherein the failure of the primary ASV is detected before the application is capable of detecting the failure.

* * * * *